A. SWAINSON.
INSECT DESTROYER.
APPLICATION FILED MAR. 9, 1909.

941,742.

Patented Nov. 30, 1909.

WITNESSES
E. C. Howe
A. L. M. Howe

INVENTOR
Alexander Swainson
BY
Max A. Schmidt
ATTORNEY

UNITED STATES PATENT OFFICE.

ALEXANDER SWAINSON, OF SPOKANE, WASHINGTON.

INSECT-DESTROYER.

941,742.

Specification of Letters Patent. Patented Nov. 30, 1909.

Application filed March 9, 1909. Serial No. 482,319.

*To all whom it may concern:*

Be it known that I, ALEXANDER SWAINSON, a citizen of the United States, residing at Spokane, in the county of Spokane and State of Washington, have invented certain new and useful Improvements in Insect-Destroyers, of which the following is a specification.

This invention relates to that class of plant insect destroyers in which the insects are knocked off the plants by a rotary brush or agitator, and precipitated into a receptacle in which they are destroyed by burning; and the object of the present invention is to improve and simplify the general structure of the machine, and also to render the machine more efficient in operation.

Figure 1:
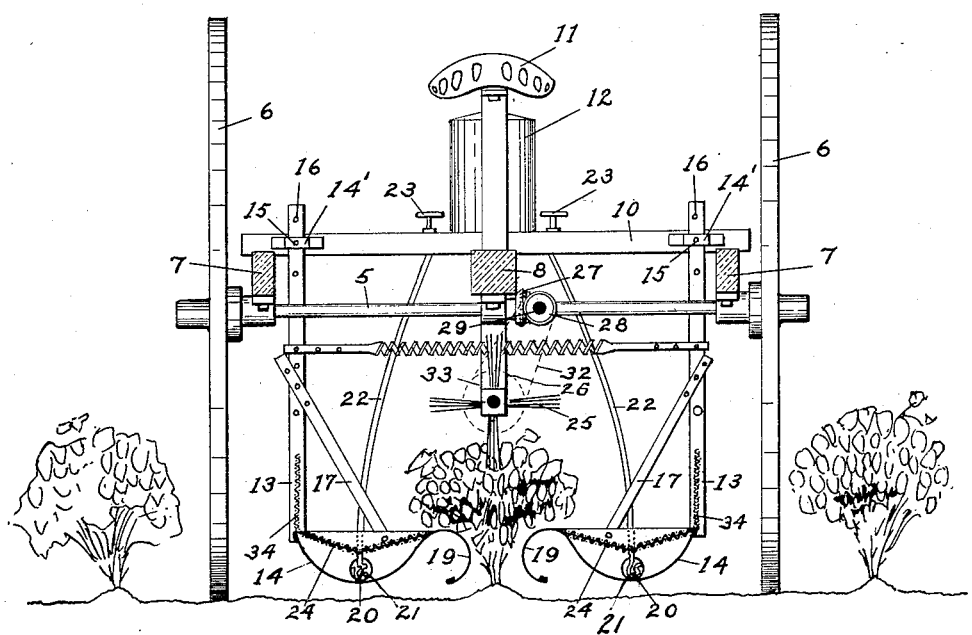
Figure 2:
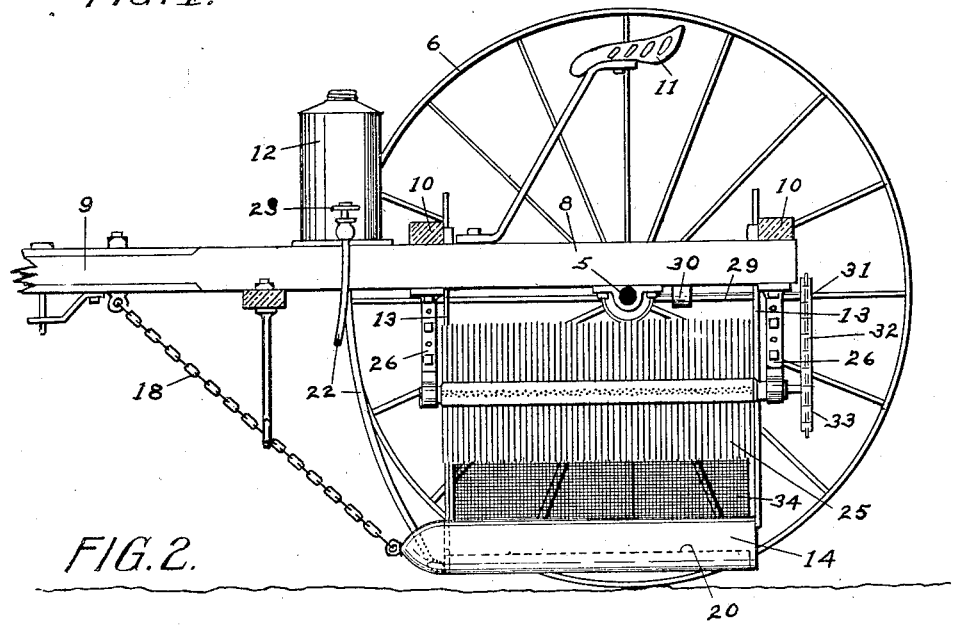

With the foregoing objects in view, the invention consists in a novel construction and arrangement of parts to be hereinafter described and claimed, reference being had to the drawing hereto annexed forming a part of this specification, in which drawing, Figure 1 is a transverse section of the machine. Fig. 2 is a longitudinal section.

The frame of the machine includes an axle 5 supported on wheels 6, and carrying spaced longitudinal side beams 7, and an intermediate longitudinal beam 8, the latter beam extending forwardly sufficiently to form a tongue 9 for attachment of the draft animals. The beams 7 and 8 are connected by transverse front and rear beams 10. A seat 11 is mounted on the beam 8, and said beam also supports an oil tank or receptacle 12.

From the beams 10, adjacent to the ends thereof, depend hangers 13 carrying the insect receiving pans 14. The hangers are secured to the beams by straps 14' fastened to the latter, and pins 15 passing through openings in said straps, and in the hangers and beams. A number of openings 16 are made in the hangers, in order that they may be adjusted vertically, and the pans thus raised or lowered to suit the height of the plants to be operated on. The pans are supported at each of their ends by these hangers, and diagonal braces 17 are connected to the hangers and the ends of the pans, whereby a strong and rigid support for the latter is had. The pans are also connected at their front ends by chains 18 to the tongue 9, and said ends are pointed as clearly shown in Fig. 2 in order that they may more readily clear weeds or other obstructions. At the inner longitudinal edges of the pans are outwardly and downwardly curved lips 19 which extend close to the plants on opposite sides thereof, beneath the foliage, and ser as a guard to prevent the insects from dropping between the plants and the pans, and thus escaping. By making the lips curved, no sharp edges are presented to the plants, and they are therefore not liable to be damaged if they are struck by the lips. In the pans are burners comprising pipes 20 which are supported on the bottom of said pans, and extend throughout the entire length thereof. The pipes have suitable burner openings, and also contain a wick 21. Pipes 22 extending from the tank 12 to the pipes 20, carry the oil or other fuel to the latter. The pipes 22 are fitted with valves 23 for controlling the flow of oil to the burners. Each pan is covered by a screen 24 located above the burners, and inclined in the direction of the center of the pans.

At 25 is indicated a rotary brush or agitator for knocking the insects off the plants and onto the screens 24. The brush is located at, and has its axis parallel to the longitudinal middle of the machine. The brush shaft is supported in bearing brackets 26 secured to and depending from the beam 10. The following gearing is employed whereby the brush is driven by the wheels 6 of the machine: On the axle 5 is a bevel gear 27 which meshes with a similar gear 28 on a shaft 29 supported in suitable bearings 30 carried by the frame of the machine. On this shaft is a sprocket wheel 31 which is connected by a chain 32 with a sprocket wheel 33 on the brush shaft.

In use, the machine is driven across the field and guided so that the plants pass between the pans. The brush being rotated, knocks the insects off the plants onto the screens, where they roll to the lowest point, the same being directly over the burners, and they are thus consumed or killed. By inclining the screens in the direction of the burners, the destruction of the insects is assured. The screens also prevent the insects from collecting around the burners and thus clogging the same. A screen 34 is also provided for the outer longitudinal edges of the pans to prevent the brush from throwing the insects too far.

I claim:

1. In an insect destroyer, a wheeled supporting frame, a wheel-driven rotary agitator carried thereby, pans located below the agitator on opposite sides thereof, burners in the pans, and screens over the pans above the burners, said screens being inclined in the direction of the burners.

2. In an insect destroyer, a wheeled supporting frame, a wheel-driven rotary agitator carried thereby, pans located below the agitator on opposite sides thereof, burners in the pans, and screens over the burners, said screens being downwardly inclined from opposite edges of the pans in the direction of the burners, and the latter being located beneath the lowest portions of the screens.

In testimony whereof I affix my signature in presence of two witnesses.

ALEXANDER SWAINSON.

Witnesses:
J. W. G. HANFORD,
M. M. NOTEWARE.